United States Patent [19]
Sanden

[11] 3,874,235

[45] Apr. 1, 1975

[54] ROTARY PISTON METER FOR MEASURING THE FLOW OF LIQUIDS

[75] Inventor: Ulrich Christian Sanden, Hildesheim, Germany

[73] Assignee: Diessel GmbH & Co., Hildesheim, Germany

[22] Filed: Sept. 7, 1973

[21] Appl. No.: 395,349

[30] Foreign Application Priority Data
Sept. 7, 1972   Germany.......................... 2243936

[52] U.S. Cl................................... 73/253, 73/257
[51] Int. Cl............................................. G01f 3/08
[58] Field of Search .............. 73/253, 255, 256, 257

[56] References Cited
UNITED STATES PATENTS
| | | | |
|---|---|---|---|
| 2,399,856 | 5/1946 | Coger | 73/257 |
| 2,789,434 | 4/1957 | Domsch | 73/257 |
| 3,595,081 | 7/1971 | Byars | 73/231 R |

FOREIGN PATENTS OR APPLICATIONS
| | | | |
|---|---|---|---|
| 847,861 | 9/1960 | United Kingdom | 73/257 |
| 1,267,394 | 6/1961 | France | 324/43 R |
| 556,976 | 7/1932 | Germany | 73/257 |

Primary Examiner—James J. Gill
Assistant Examiner—Anthony V. Ciarlante
Attorney, Agent, or Firm—Gilbert L. Wells; Krafft & Wells

[57] ABSTRACT

A rotary piston meter for measuring the flow of liquids, in which the rotary piston is provided with at least one magnet which acts on a primary element disposed outside the meter chamber, characterized in that the magnet (3) is arranged in the rotary piston (1) perpendicular to its plane of movement and is adapted to move during its rotation in an annular track disposed opposite to the primary element (10) which is provided with at least one counterpole (14) and is coaxially arranged in the meter housing (4).

12 Claims, 5 Drawing Figures

ROTARY PISTON METER FOR MEASURING THE FLOW OF LIQUIDS

BACKGROUND OF THE INVENTION

The present invention relates to a rotary piston meter for measuring the flow of liquids, wherein the rotary piston is provided with at least one magnet which acts on a primary element disposed outside the meter chamber.

In the case of known rotary piston meters of this type, magnets are arranged in the rotary piston in such a way that their magnetic force acts radially outwards on the primary element arranged dead center of the rotary piston meter. An impulse is released by the primary element each time the magnet or magnets in the rotary piston pass by.

The disadvantage of the known devices is that only one impulse is released per revolution of the rotary piston. In addition to this, the amplitude of the impulse released is a function of the rate of rotation of the rotary piston. At low flow rates, and thus at low rotational speeds of the rotary piston, the operation of the prior art devices is relatively inaccurate.

SUMMARY OF THE INVENTION

Having in mind the limitations of the prior art, it is an object of the present invention to provide a rotary piston meter of the type mentioned above which is constructed in such a way that the accuracy of the measurement released can be increased at a minimal constructional cost.

According to the present invention, this prior art problem is solved in that the magnet is arranged in the rotary piston perpendicular to its plane of movement, and in that it is movable during its rotation in an annular track disposed opposite to the primary element which is provided with at least one counterpole and is coaxially arranged in the housing.

By means of this arrangement, using only one magnet and a single counterpole, the counterpole can be arranged in such a manner that, independent of the dead center position of the rotary piston, it is possible to obtain the most favorable rotational rate of the piston at the counterpole while the magnet is passing by, as the rotary piston rotates at an irregular rate owing to its eccentric movement. In this way, the amplitude of the impulse, and thus the accuracy of the measurement, can be increased.

By arranging the magnet in the rotary piston perpendicular to its plane of movement, that is, parallel to the axis of the meter housing, the magnet is the same distance from the primary element in all relative positions of the rotary piston, so that it is not necessary to use a dead center position in which there is the least distance between the magnet and the primary element — as is the case of the prior art arrangements.

By reason of the type of construction of the rotary piston meter according to the present invention, the number of counterpoles of the primary element can be increased, thus giving rise to a corresponding increase in the number of primary impulses emitted by the primary element, thereby considerably increasing measuring accuracy as compared to the known meters. Furthermore, the counterpoles can be unevenly distributed over the periphery of the primary element, whereby, without any additional constructional expenditure, it is possible to compensate for the shortcomings in the operating system of the rotary piston meter, which is disposed in the center of the rotary piston while the rotational rates are irregular owing to the eccentric movement of the same.

The arrangement according to the present invention has the advantage of much lower constructional expenditure and a considerable reduction in costs over the prior art rotary piston meters with mechanical measurement emission means and the prior art rotary piston meters with a separate impulse counter. Furthermore, the meter according to the present invention is far less susceptible to interference and more wear resistant.

As a result, the primary element can easily be mounted in the rotary piston meter housing. Accordingly, the housing of the rotary piston meter is provided with a rear, central support for receiving the primary element. The primary element can be releasably and interchangeably arranged in this support. For the purpose of increasing accuracy, it is particularly advantageous for the primary element to be provided with a plurality of counterpoles arranged opposite to the track for the magnet or magnets in the rotary piston, as mentioned above. Thus, in the case of the device according to the invention, owing to the independence from a specific dead center position, and in contrast to the prior art devices, it is possible to use in the piston a plurality of magnets which can also be arranged diagonally opposite each other.

It is particularly advantageous as far as the further processing of the impulses emitted by the primary element is concerned, for the primary element to be provided with at least one semi-conductor element to which conductive strips of ferromagnetic material lead, forming the counterpoles. This provides a simple and strong construction which does not necessitate inductive coils or the like. It is also particularly advantageous for the semi-conductor element or elements to be Hall generators.

The use of this type of semi-conductor element makes it possible for the primary element to be of very small construction and the semi-conductor elements and conductive strips can be sealed into a primary element housing, in an advantageous manner so that they are protected against practically any damage.

In addition, the semi-conductor elements have the advantage that they emit a signal voltage which is independent of the rotational rate of the magnets passing by. In contrast to the known inductive data transmitters, no special measures are required to keep the amplitude of the impulses at a minimum volume.

Instead of semi-generators, field plates can also be used, in which the inner resistance varies as a function of the magnetic field. Evaluation can then take place in a bridge circuit. In contrast to Hall generators, no operating voltage has to be supplied to the field plates so that only two connecting lines are required.

Owing to the small structure of the primary element, the free end of the primary element casing can be directly provided with a known screw coupling provided with a screw cap and intended for the lines to the primary element.

An especially simple type of construction is obtained if two opposite poles are formed by a common U-shaped conductive strip and the free ends of the U-shank being bent outwards at right angles and forming the poles. With this kind of construction, two Hall generators can be disposed in the region of the cross-bar of the U-shaped conductive strip and these Hall generators can be connected to a conductor rod which is adjacent to the cross-bar of the U-shaped conductive strip. The bent ends of the U-shank can be supported in the casing before sealing by means of an annular supporting plate.

This type of construction has the particular advantage that, in spite of the use of a plurality of poles, only one semi-conductor element is required, thus necessitating a correspondingly small number of feed lines. This also represents an advantage over the known devices, which operate with a plurality of inductive coils.

A further increase in measuring accuracy is obtained when evaluating the primary impulses by connecting in series with the primary element an impulse multiplying device having a corresponding impulse counter. With this type of device, an appropriate number of secondary impulses can be provided for a primary impulse so that a single impulse, for example, a four place impulse, is converted into approximately ten thousand secondary impulses.

The impulse multiplying device consists advantageously of an impulse generator, the impulses of which are supplied to a gate step connection. The impulse generator operates at constant frequency and the impulses produced by this generator are supplied to the gate step connection which closes when a specific, predetermined number of impulses is reached and only opens when a new primary impulse is received from the primary element. The secondary impulses passing the gate step in this manner are then evaluated.

Apart from providing more precise evaluation of impulses, the use of an impulse multiplying device has the advantage that it is possible to obtain a meter calibration by electronic means, whereby in determining a deviation between the charge of the calibration receptacle and the associated given rotational rate of the rotary piston meter, the number of secondary impulses can be increased accordingly. In practice, this is effected by altering the soldering jumpers which prevents the calibration from being subsequently altered at random. This type of calibration is substantially easier to effect than the calibration of the known mechanical devices operating with changeable gears. In addition, it has the advantage that considerably greater ranges of variation and sensitive adjustments are rendered possible.

In the case of known rotary piston meters with mechanical data output means, the rotary piston is mechanically held in its final position after the measurement of the liquid flow has been terminated, so as to prevent further metering. As no mechanically controllable parts are provided outside the housing in the case of the rotary piston arrangement according to the present invention, the rotary piston will drop down by its own weight when it is located above its lower dead center position after the termination of the liquid flow measurement. This is made possible by the gradual passage of the liquid still contained therein through the gap leading to its inside. As a result, further metering processes can be started.

To prevent this from happening, according to the present invention, a frequency dependent impulse control step is connected in series with the primary element. This impulse control step blocks the metering operation at low frequencies. In this way, when the primary impulses with the very low frequency caused by the gradual dropping of the rotary piston, are received, these impulses are not metered. Advantageously, the impulse control step is provided with a digital filter consisting of integrated semi-conductor components.

A decade divider step is advantageously connected in series with the impulse counter for the final evaluation of the flow measurement. This divider step retraces the number of secondary impulses coming from the impulse counter to the magnitude of the number of primary impulses.

BRIEF DESCRIPTION OF THE DRAWINGS

An embodiment of the invention will now be described in more detail with reference to the accompanying drawings, in which.

DESCRIPTION OF THE PREFERRED EMBODIMENTS

Figure 1:
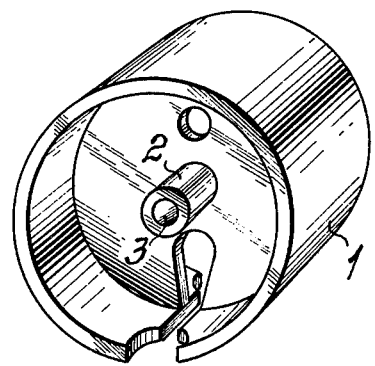
FIG. 1 shows a perspective rear view of the rotary piston meter, which is provided according to the invention with a magnet arranged coaxially with respect to the rotary piston.

According to FIG. 1, the rotary piston 1 of a rotary piston meter is provided on its side facing towards the feed lines to the meter with a coaxial journal 2 in which a permanent magnet 3 is inserted, so that this permanent magnet is arranged coaxially with respect to the rotary piston 1, and thus perpendicular to its plane of movement.

Figure 2:
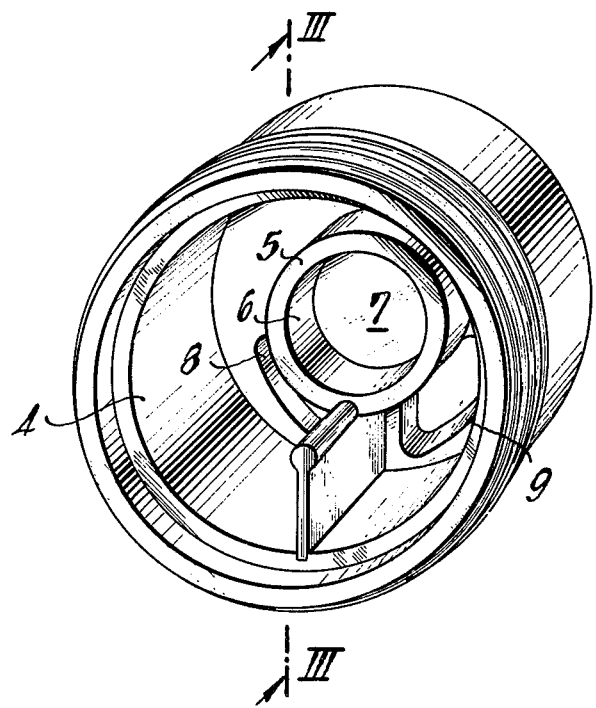
FIG. 2 is a perspective view of the open housing of the rotary piston meter.

When the rotary piston 1 is inserted into the housing 4 according to FIG. 2, the journal 2 is engaged in the inner space 6 of a guide 5 for the rotary piston. The inner space 6 of the guide 5 is outwardly closed by a dividing wall 7, behind which is disposed the primary element 10 of the rotary piston meter (see FIG. 3). The magnet 3 mounted in the journal 2 of the rotary piston 1 is moved with the movement of the rotary piston 1 in the guide 5 on an annular track on the wall 7, thus passing the primary element 10. In FIG. 2, 8 and 9 designate the outlet from and the inlet to the chamber respectively of the rotary piston meter.

Figure 3:
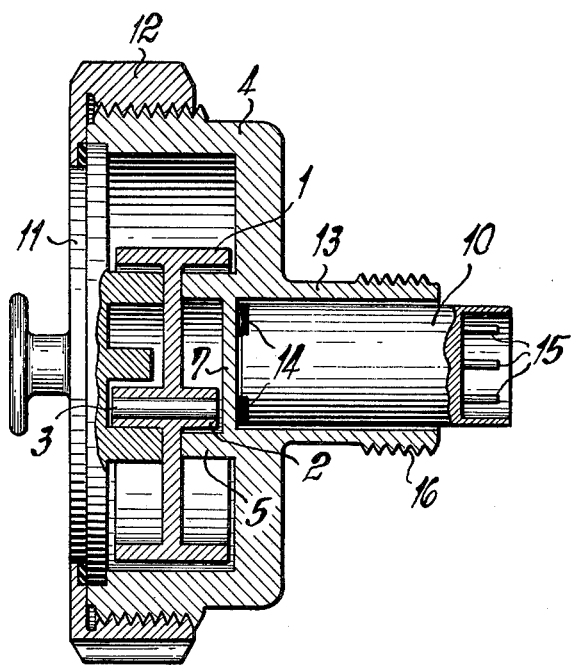
FIG. 3 is a section along the line III—III of FIG. 2 through the housing of the rotary piston meter with the piston inserted therein and the cover arranged thereupon.

FIG. 3 represents the section along the line III—III through the housing 4 of the rotary piston meter according to FIG. 2. In FIG. 3, the housing 4 is closed by a cover 11 which is pressed against the housing 4 by a large cap screw 12, with sealing elements placed therebetween. In FIG. 3, the rotary piston 1 is inserted into the housing 4 so that the relationship of the journal 2 of the magnet 3 to the dividing wall 7 and the primary element 10 can be seen. The rotary piston 1 is also provided with a journal on its side facing towards the cover 11. This is guided by the cover 11 which forms the actual guide means for the center of the rotary piston.

The primary element 10 is mounted in a support 13 of the housing 4, and thus its diagrammatically indicated counterpoles 14 are disposed behind the separating wall 7. 15 designates the rear connections of the primary element 10. For the purpose of securing the primary element 10 in the support 13, the latter can be provided with a screw thread 16 or the like, adapted to receive a cap screw. It is possible to use other methods of securing the primary element in the housing 4 or the support 13.

Figure 4:
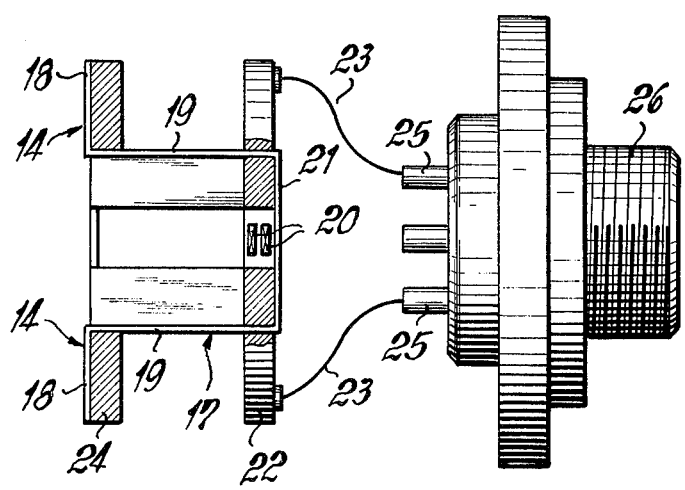
FIG. 4 is a diagrammatic view of an embodiment of the primary element.

FIG. 4 is a diagrammatic view of an embodiment of the primary element in which the two diagonally opposite poles 14 consist of a common U-shaped conductive strip 17 of ferromagnetic material. The free ends 18 of the U-shank 19 are bent outwards at right angles, thus forming the two poles 14. Two semi-conductor elements 20 (Hall generators) are arranged in the region of the cross-bar 21 of the U-shaped conductive strip 17 and are connected to a conductor rod 22, to which the lines 23 also lead. The free ends 18 of the conductive strip 17 forming the poles 14 can be mounted, as indicated, on a supporting plate 24 and the entire arrangement can be sealed into a cup-shaped housing of the primary element. This sealing includes the soldered contacts 25 which lead to the pins of a known screw coupling 26 provided with a screw cap. As a result, the cup-shaped housing of the primary element only leaves free the connection in the region of the coupling 26. It is, therefore, practically impossible to damage the primary element.

More than two poles can be provided in place of the arrangement described above, thereby providing the previously described advantages consisting in increasing the number of primary impulses and in compensating the shortcomings of the operating system. As only one semi-conductor element is required for a plurality of poles, the number of connections can be kept relatively small in spite of a greater number of poles.

Figure 5:
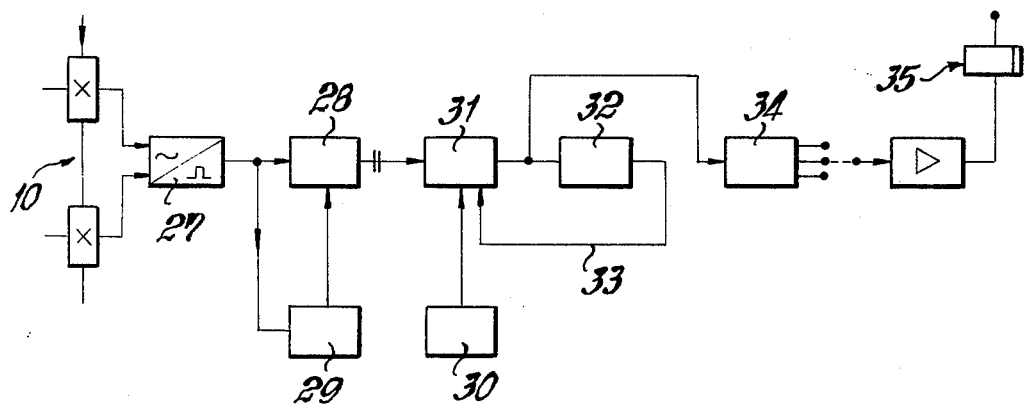
FIG. 5 is a block diagram of the device for evaluating the meter impulses.

FIG. 5 represents a block diagram of a device for evaluating the impulses supplied by the device according to the invention. The approximately sinusoidal impulses coming from the primary element 10 are first supplied to an impulse converter 27 which produces rectangular impulses. A frequency dependent inpulse control step 28 comprising a digital filter 29 consisting of semi-conductor components is connected in series with the impulse converter 27. The digital filter 29 is designed to block the metering of impulses arriving with relatively low frequencies, to prevent further metering after the flow measurement has been terminated when the rotary piston is intended to drop down by its own weight.

A device for multiplying the impulses is connected in series with the impulse control step. This multiplying device comprises an impulse generator 30 operating at a constant frequency, preferably 750 kHz, a gate step connection 31 and an impulse counter 32. The impulse generator 30 acts on the gate step connection 31 in such a manner that a larger number of secondary impulses is provided for each primary impulse coming from the primary element. For example, ten thousand secondary impulses may be provided for each primary impulse. On reaching the predetermined number of secondary impulses released by the arrival of a primary impulse, the gate step blocks the supply of further impulses from the impulse generator until the gate step is opened on the arrival of a new primary impulse. The secondary impulses are counted by the impulse counter 32 and the gate step is acted on via the diagrammatically indicated connection 33 by an impulse counter 32 with the number of secondary impulses there engaged, corresponding to a primary impulse. The impulse counter 32 can be used to calibrate the device by means of the variable adjustment of the number of impulses it is adapted to count.

A decade divider step 34 is connected in series with the impulse multiplying device. The divider step 34 retraces the number of secondary impulses back to the magnitude of the number of primary impulses, to enable the actual evaluation to take place in step 35.

I claim:

1. A rotary piston meter for measuring the flow of liquids having a housing with a first cylindrical compartment and a second cylindrical compartment, said compartments separated by a vertical wall, said compartments located coaxial on a horizontal axis perpendicular to said vertical wall, an annular track located in said first compartment perpendicular to said horizontal axis, a rotary piston located in said first compartment having at least one magnet (3) parallel to said horizontal axis and adapted to move during its rotation in said annular track, a primary element (10) located in said second compartment provided with counterpoles (14) opposite said annular track, said counterpoles defined by diagonally opposite free ends (18) bent outwardly at right angles of a U-shaped conductive strip (17) of ferromagnetic material, said conductive strip (17) having a crossbar (21) and at least one semi-conductor element located in proximity to said cross-bar (21).

2. A rotary piston meter according to claim 1, wherein said magnet (3) is coaxially disposed in said rotary piston (1) in a central journal (2) of said rotary piston.

3. A rotary piston meter according to claim 1, wherein said semi-conductor element is a Hall generator.

4. A rotary piston meter according to claim 3, wherein said semi-conductor element and said conductive strips (17) are disposed sealed in a primary element housing.

5. A rotary piston meter according to claim 4, wherein said primary element housing has a free end provided with a screw coupling (26) provided with a cap nut.

6. A rotary piston meter according to claim 1, wherein two Hall generators (20) are disposed in the region of the cross-bar (21) of the U-shaped conductive strip (17).

7. A rotary piston meter according to claim 1, wherein an impulse multiplying device (30, 31) with a corresponding impulse counter (32) is connected in series with the primary element (10).

8. A rotary piston meter according to claim 7, wherein said impulse multiplying device consists of an impulse generator (30), the impulses of which are supplied to a gate step connection (31).

9. A rotary piston meter according to claim 1, wherein a frequency dependent impulse control step (28) which blocks the metering at low frequencies, is connected in series with the primary element (10).

10. A rotary piston meter according to claim 9, wherein said impulse control step (28) comprises a digital filter (29) consisting of integrated semi-conductor components.

11. A rotary piston meter according to claim 10, wherein a decade divider step (34) is connected in series with the impulse multiplying device, said divider step (34) retracing the number of secondary impulses to the magnitude of the number of primary impulses coming from the primary element (10).

12. A rotary piston meter according to claim 1, wherein said semi-conductor element is a field plate.

* * * * *